US009800354B2

United States Patent
Suzuki et al.

(10) Patent No.: US 9,800,354 B2
(45) Date of Patent: Oct. 24, 2017

(54) WIRELESS COMMUNICATION APPARATUS

(71) Applicant: DENSO CORPORATION, Kariya, Aichi-perf. (JP)

(72) Inventors: Tadao Suzuki, Kariya (JP); Yasumune Yukizaki, Okazaki (JP); Koutarou Takaba, Kariya (JP); Yuji Sugimoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 233 days.

(21) Appl. No.: 14/507,039

(22) Filed: Oct. 6, 2014

(65) Prior Publication Data

US 2015/0099475 A1 Apr. 9, 2015

(30) Foreign Application Priority Data

Oct. 7, 2013 (JP) .................................. 2013-210327

(51) Int. Cl.
*H04B 15/00* (2006.01)
*H04B 1/44* (2006.01)
*H04W 52/24* (2009.01)
*H04B 17/345* (2015.01)
*H04B 1/525* (2015.01)

(52) U.S. Cl.
CPC .............. *H04B 15/00* (2013.01); *H04B 1/44* (2013.01); *H04B 1/525* (2013.01); *H04B 17/345* (2015.01); *H04W 52/243* (2013.01)

(58) Field of Classification Search
CPC ........ H04B 15/00; H04B 17/345; H04B 1/44; H04B 1/525; H04W 52/243
See application file for complete search history.

(56) References Cited

U.S. PATENT DOCUMENTS

2006/0003798 A1  1/2006  Mizukami
2008/0139200 A1  6/2008  Zhu et al.
(Continued)

FOREIGN PATENT DOCUMENTS

JP  08-255117    10/1996
JP  2003-185444   7/2003
(Continued)

OTHER PUBLICATIONS

Office Action dated Dec. 8, 2015 issued in the corresponding JP application No. 2013-210327 in Japanese with English translation.
(Continued)

*Primary Examiner* — Lewis West
(74) *Attorney, Agent, or Firm* — Harness, Dickey & Pierce, P.L.C.

(57) ABSTRACT

A wireless communication apparatus includes a first wireless communication unit performing a first type wireless communication and a second wireless communication unit performing a second type wireless communication, an interference determination portion, and an interference suppression portion. The interference determination portion determines whether the first wireless communication unit is in an interference state based on a radio wave reception state of the first wireless communication unit acquired when the second wireless communication unit is in a transmitting state. In the interference state, radio waves received by the first wireless communication unit are interfered by the radio waves transmitted from the second wireless communication unit. The interference suppression portion executes an interference suppression process in response to the interference state by suppressing the radio waves transmitted from the second wireless communication from interfering with the radio waves received by the first wireless communication unit.

1 Claim, 12 Drawing Sheets

(56) References Cited

U.S. PATENT DOCUMENTS

| | | |
|---|---|---|
| 2009/0028115 A1 | 1/2009 | Hirsch |
| 2010/0183061 A1 | 7/2010 | Imahashi et al. |
| 2013/0064111 A1* | 3/2013 | Linsky ................ H04W 52/243 370/252 |
| 2014/0099893 A1* | 4/2014 | Kheirkhahi ............ H04B 1/525 455/41.2 |
| 2014/0349594 A1* | 11/2014 | Hoshihara .............. H04B 1/109 455/77 |

FOREIGN PATENT DOCUMENTS

| | | |
|---|---|---|
| JP | 2005-020158 | 1/2005 |
| JP | 2006-020041 | 1/2006 |
| JP | 2006-020042 | 1/2006 |
| JP | WO 2008/152813 | 12/2008 |
| JP | 2009-005195 | 1/2009 |
| JP | 2009-065307 | 3/2009 |
| JP | 2009-077446 | 4/2009 |
| JP | 2009-526428 | 7/2009 |
| JP | 2010-512715 | 4/2010 |
| JP | 2012-169938 | 9/2012 |
| JP | 2012-222797 | 11/2012 |
| JP | 2013-030919 | 2/2013 |
| WO | WO 0011806 A1 * | 3/2000 ........... H04B 7/0608 |

OTHER PUBLICATIONS

Office Action mailed Sep. 15, 2015 in the correspodning JP Application No. 2013-210327 with English translation.

* cited by examiner

WIRELESS COMMUNICATION APPARATUS

CROSS REFERENCE TO RELATED APPLICATION

This application is based on Japanese Patent Application No. 2013-210327 filed on Oct. 7, 2013, the disclosure of which is incorporated herein by reference.

TECHNICAL FIELD

The present disclosure relates to a wireless communication apparatus that is able to perform two types of wireless communications.

BACKGROUND

A wireless communication apparatus that is able to perform two types of wireless communications is well known. For example, JP 2005-20158 A discloses a communication apparatus that has a near field communication function, which is similar to a communication function of a contactless IC card, and a communication function utilizing a mobile network.

In order to avoid an interference to one radio communication from another radio communication, in the communication apparatus disclosed in JP 2005-20158 A, a communication via the mobile network is deactivated when an operation of the near field communication function is detected.

As disclosed in JP 2005-20158 A, in a communication apparatus that performs two types of wireless communications, when a first type communication is continually set in a deactivated state while a second type communication is being performed, the first type communication cannot start operation and cannot provide services to a user.

The radio waves interfered with each other may also be suppressed by a filter. However, a coupling amount of radio waves increases with a size reduction of an antenna. Thus, the filter cannot sufficiently suppress the increasing amount of the radio waves that interfere with one another.

SUMMARY

In view of the foregoing difficulties, it is an object of the present disclosure to provide a wireless communication apparatus that is able to perform two types of wireless communications and is able to suppress radio waves transmitted from a second wireless communication unit from interfering with radio waves received by a first wireless communication unit with reduction of a communication suppression made to the second wireless communication unit.

According to an aspect of the present disclosure, a wireless communication apparatus includes a first wireless communication unit performing a first type wireless communication and a second wireless communication unit performing a second type wireless communication different from the first type wireless communication, an interference determination portion, and an interference suppression portion. The interference determination portion acquires a radio wave reception state of the first wireless communication unit when the second wireless communication unit transmits radio waves, and determines whether the first wireless communication unit is in an interference state based on the radio wave reception state of the first wireless communication unit. The interference state is a state in which radio waves received by the first wireless communication unit are interfered by the radio waves transmitted from the second wireless communication unit. The interference suppression portion executes an interference suppression process in response to a determination of the interference state by the interference determination portion. The interference suppression process suppresses the radio waves transmitted from the second wireless communication from interfering with the radio waves received by the first wireless communication unit.

With the above apparatus, when the radio waves received by the first wireless communication unit are determined to be interfered by the radio waves transmitted from the second wireless communication unit, the interference suppression process is executed. Thus, the interference caused by the radio waves transmitted from the second wireless communication unit to the radio wave received by the first wireless communication unit can be suppressed.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
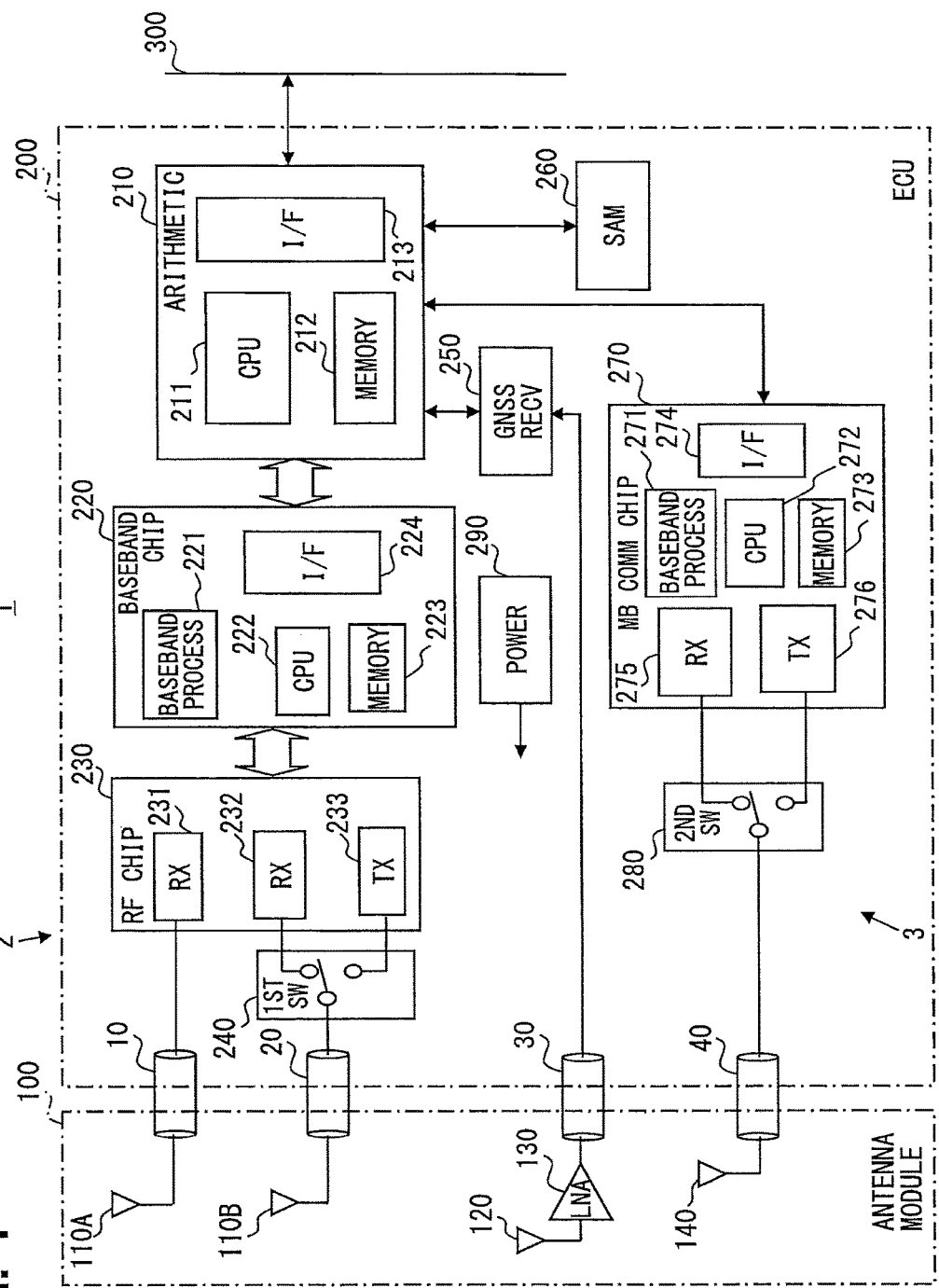
FIG. 1 is a diagram showing a configuration of a vehicular wireless communication apparatus according to a first embodiment of the present disclosure.

The following will describe a first embodiment of the present disclosure with reference to accompanying drawings. As shown in FIG. 1, a wireless communication apparatus 1 equipped to a vehicle includes an antenna module 100 and an electronic control unit (ECU) 200. The wireless communication apparatus 1 provides a vehicle-to-vehicle communication function, a roadside-to-vehicle communication function, and a mobile phone communication function. Hereinafter, the wireless communication apparatus 1 equipped to the vehicle is also referred to as a vehicular wireless communication apparatus. The wireless communication apparatus 1 also receives radio waves from a navigation satellite used for global navigation satellite system (GNSS). Hereinafter, vehicle-to-vehicle communication and roadside-to-vehicle communication are generally referred to as a V2X communication.

The following will describe a configuration of the antenna module 100.

As shown in FIG. 1, the antenna module 100 includes two antennas 110A, 110B for V2X communication. Hereinafter, the antenna for V2X communication is also referred to as a V2X antenna. In the present embodiment, a frequency band of V2X communication is set as 5.9 gigahertz (GHz) band. Each of the V2X antennas 110A, 110E has an electric length for receiving radio waves within the 5.9 GHz band. As another example, the frequency band of V2X communication may also be set as 700 megahertz (MHz) band.

The two V2X antennas 110A, 110B are connected with respective coaxial cables 10, 20. Among the two V2X antennas 110A, 110B, the V2X antenna 110A is only used for receiving radio waves. The other V2X antenna 110B is used for transmitting and receiving radio waves.

In addition to the two V2X antennas 110A, 110B, the antenna module 100 may further have a GNSS antenna 120 for receiving radio waves transmitted from the navigation satellite, a low noise amplifier (LNA) 130, and an antenna 140 for a mobile phone communication. The antenna 140 for the mobile phone communication is also referred to as a mobile phone antenna. A frequency band of the mobile phone communication is lower than the frequency band of the V2X communication, which is 5.9 GHz. For example, the frequency band of the mobile phone communication may use 700-900 MHz band, 1.8 GHz band, or 2.1 GHz band. The mobile phone antenna 140 has an electric length for receiving radio waves at one of the multiple frequency bands that are used for the mobile phone communication.

The GNSS antenna 120 is connected with the low noise amplifier 130, and the low noise amplifier 130 is connected with a coaxial cable 30. The mobile phone antenna 140 is connected with a coaxial cable 40.

The following will describe a configuration of the ECU 200.

As shown in FIG. 1, the ECU 200 includes an arithmetic section (ARITHMETIC) 210, a baseband chip 220, a radio frequency (RF) chip 230, a first switch circuit 240, a GNSS receiver (GNSS RECV) 250, a security access module (SAM) 260, a mobile phone communication chip (MB COMM CHIP) 270, a second switch circuit 280, and a power circuit 290.

Figure 3:
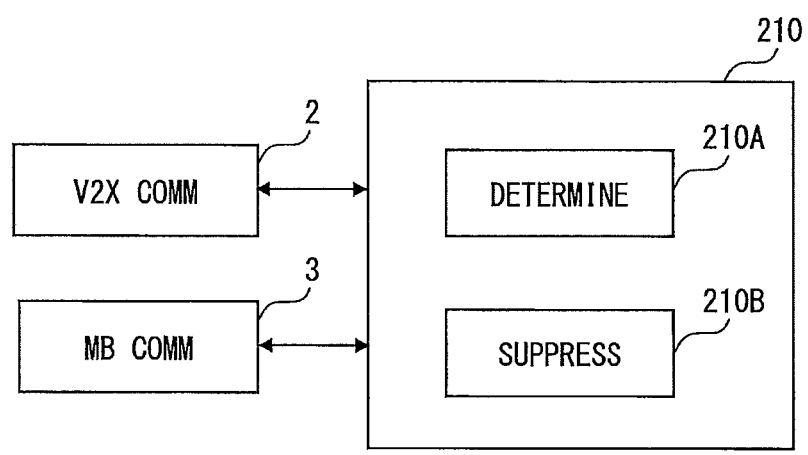
FIG. 3 is a block diagram showing a configuration of a arithmetic section of ECU.

The arithmetic section 210 includes a central processing unit (CPU) 211, a memory 212, and an interface (I/F) 213. The arithmetic section 210 is connected a vehicle local area network (LAN) 300, and transmits or receives signals to or from other devices equipped to the vehicle via the vehicle LAN 300. The arithmetic section 210 is mutually communicably connected with other circuits or components of the ECU 200, such as, the baseband chip 220, the mobile phone communication chip 270 and the like. The arithmetic section 210 can acquire various informations via the vehicle LAN 300 or from other internal circuits of the ECU 200. The arithmetic section 210, based on the acquired information, functions as an interference determination portion (DETERMINE) 210A and an interference suppression portion (SUPPRESS) 210B as shown in FIG. 3.

The baseband chip 220 includes a baseband processing unit (BASEBAND PROCESS) 221, a CPU 222, a memory 223, and an interface (I/F) 224. The baseband chip 220 mutually communicates with the arithmetic section 210 and the RF chip 230 via the interface 224.

The baseband processing unit 221 generates a signal for modulation, and processes received signal for extracting original data from the received signal. The CPU 222 controls the baseband processing unit 221 to generate the signal for modulation and to extract the original data from the received signal. The CPU 222 controls transmission timings of the outgoing signals. The CPU 222 detects a strength of the received signal and calculates an error rate of the received signal. The memory 223 temporarily stores the data extracted from the received signal and other data.

The RF chip 230 includes two receiving circuits (RX) 231, 232 and one transmitting circuit (Do) 233. The receiving circuit 231 is connected with the coaxial cable 10, and receives a signal, which is received by the antenna 110A, via the coaxial cable 10. The receiving circuit 231 transmits input signal from the antenna 110A to the baseband chip 220 after filtering and amplifying the input signal.

The other receiving circuit 232 has similar configurations and functions with the above-described receiving circuit 231. The other receiving circuit 232 is connected with the antenna 110B via the first switch circuit 240 and the coaxial cable 20. The transmitting circuit 233 is connected with the first switch circuit 240.

The first switch circuit 240 connects the receiving circuit 232 with the coaxial cable 20 or connects the transmitting circuit 233 with the coaxial cable 20. That is, the first switch circuit 240 switches a connection state between a first state in which the receiving circuit 232 is connected with the coaxial cable 20 and a second state in which the transmitting circuit 233 is connected with the coaxial cable 20. The first switch circuit 240 switches the connection state between the first state and the second state based on a signal transmitted from the baseband chip 220. In the present embodiment, the baseband chip 220 and the RF chip 230 perform the vehicle-to-vehicle communication and the roadside-to-vehicle communication based on a communication standard defined in IEEE802.11p.

The GNSS receiver 250 is connected with the GNSS antenna 120 via the coaxial cable 30. The GNSS receiver 250 performs a filtration, amplification, demodulation to signals supplied from the GNSS antenna 120, and transmits received data to the arithmetic section 210.

The SAM 260 performs encryption to the information transmitted via the vehicle-to-vehicle communication or via the roadside-to-vehicle communication, and performs decryption to the information received via the vehicle-to-vehicle communication or via the roadside-to-vehicle communication.

The mobile phone communication chip 270 includes a baseband processing unit (BASEBAND PROCESS) 271, a CPU 272, a memory 273, an interface (I/F) 274, a receiving circuit (RX) 275, and a transmitting circuit (TX) 276. The mobile phone communication chip 270 mutually communicates with the arithmetic section 210 via the interface 274.

The baseband processing unit 271 generates a signal for modulation, and extracts original data before a modulation from a received signal by processing the received signal. The CPU 272 controls internal components of the mobile phone communication chip 270, such as the base band processing unit 271. The memory 273 temporarily stores data that is extracted, from the received signal, by the base band processing unit 271.

The receiving circuit 275 is connected with the mobile phone antenna 140 via the second switch circuit 280 and the coaxial cable 40. The receiving circuit 275 receives, from the mobile phone antenna 140, signals that are received by the mobile phone antenna 140. The receiving circuit 275 performs a filtration, amplification to the received signal, and transmits the processed signal to the baseband processing unit 271.

The transmitting circuit 276 modulates and amplifies the signal generated by the baseband processing unit 271. The transmitting circuit 276 has a variable amplification gain. The transmitting circuit 276 is connected with the mobile phone antenna 140 via the second switch circuit 280 and the coaxial cable 40. The transmitting circuit 276 modulates and amplifies signals, and outputs processed signals to the mobile phone antenna 140. The mobile phone antenna 140 transmits the modulated and amplified signals processed by the transmitting circuit 276 as outgoing radio waves. The transmitting circuit 276 has a variable transmission power and a variable transmission channel (communication channel). The transmission power and the transmission channel are controllable by control signals output from the CPU 272.

The second switch circuit 280 connects the receiving circuit 275 with the coaxial cable 40 or connects the transmitting circuit 276 with the coaxial cable 40. That is, the second switch circuit 280 switches a connection state between a third state in which the receiving circuit 275 is connected with the coaxial cable 40 and a fourth state in which the transmitting circuit 276 is connected with the coaxial cable 40. The second switch circuit 280 switches the connection state between the third state and the fourth state based on a signal output from the mobile phone communication chip 270.

The power circuit 290 supplies power to the components included in the ECU 200, and supplies power to the components included in the antenna module 100.

The baseband chip 220, the RF chip 230, the first switch circuit 240, the V2X antennas 110A, 110b, the coaxial cables 10, 20 configure a V2X communication unit 2. The V2X communication unit 2 is also referred to as a first wireless communication unit. The mobile phone communication chip 270, the second switch circuit 280, the mobile phone antenna 140, and the coaxial cable 40 configure a mobile phone communication unit 3. The mobile phone communication unit 3 is also referred to as a second wireless communication unit.

Figure 2:
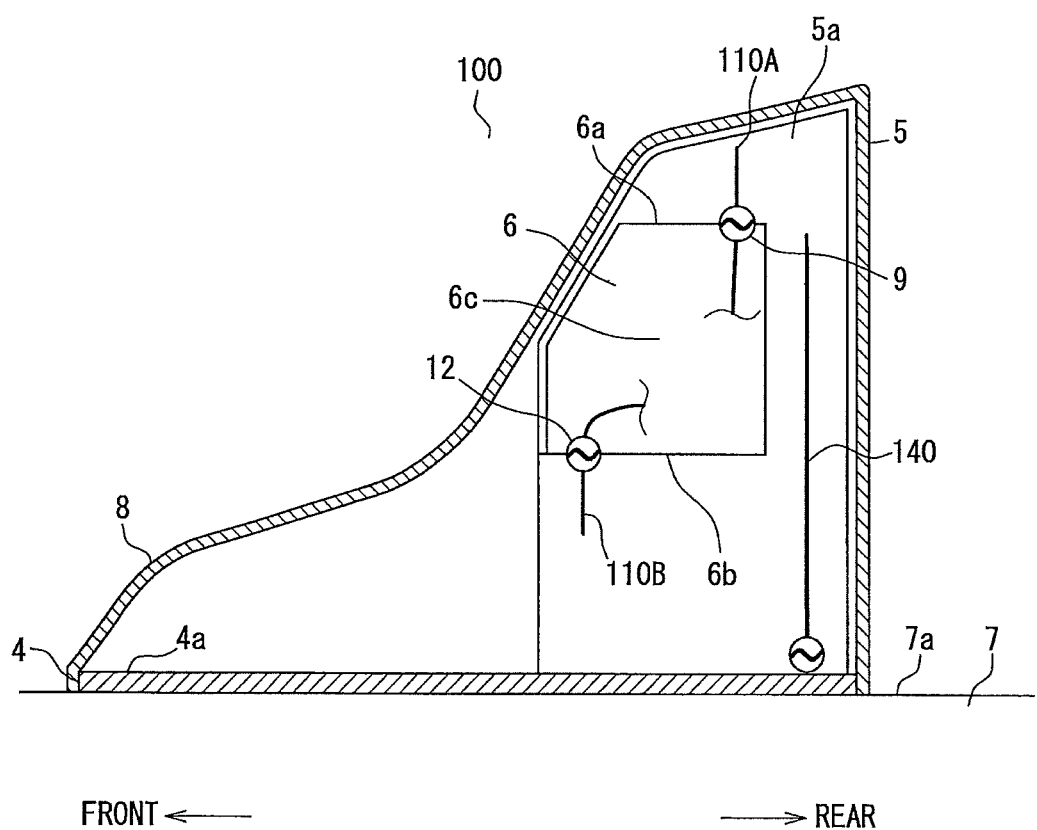
FIG. 2 is a diagram showing an antenna module equipped to a vehicle.

The following will describe an equipment of the antenna module 100 to a vehicle. FIG. 2 shows an example of the equipment of the antenna module 100 to a vehicle. FIG. 2 is a diagram illustrating a position relation of the V2X antennas 110A, 110B and the mobile phone antenna 140. Other configurations are not shown in FIG. 2 for simplification.

The antenna module 100 has a housing 8. The housing 8 has a streamlined shape in a front (FRONT) to rear (REAR) direction with respect to a vehicle. The streamlined shape is selected for appearance design. For example, the housing 8 has a shark-fin shape.

The antenna module 100 has a ground plate 4. The ground plate 4 is made of metal and has an approximately rectangular planar shape. Under a state that the antenna module 100 is mounted on a roof surface 7a of a vehicle roof 7, the ground plate 4 is disposed along the roof surface 7a of the vehicle roof 7. On a ground plate surface 4a of the ground plate 4, which is an upper surface of the ground plate 4, a substrate 5 made of resin and having a planar shape is disposed in a standing manner approximately perpendicular to the ground plate 4.

On one surface 5a of the substrate 5, an antenna ground 6 that is provided by conductor pattern (conductor film) is disposed. Further, on the surface 5a of the substrate 5, a connection portion (not shown) that electrically connects the antenna ground 6 with the ground plate 4 is also formed by conductor pattern. In the present embodiment, the antenna ground 6 has a rectangular shape.

The V2X antenna 110A is connected to an upper end portion 6a of the antenna ground 6. The V2X antenna 110A is provided by a linear monopole antenna and receives vertically polarized waves. The V2X antenna 110A is disposed so that the V2X antenna 110A extends in a direction from a base end portion to a front end portion of the V2X antenna 110A. The direction from the base end portion to the front end portion is a direction moving away from the antenna ground 6 perpendicular to the upper end portion 6a of the antenna ground 6. The V2X antenna 110A has a length (element length) that is electrically equal to quarter wavelength. For example, the element length may be set equal to a length acquired by multiplying quarter wavelength of 5.9 GHz radio wave with a wavelength shortening rate defined by a relative permittivity of material of the substrate 5. A feeding point 9 that supplies power to the V2X antenna 110A is disposed at the base end portion of the V2X antenna 110A.

The V2X antenna 110B is connected to a lower end portion 6b of the antenna ground 6. The V2X antenna 110B is provided by a linear monopole antenna and receives vertically polarized waves. The V2X antenna 110B is disposed so that the V2X antenna 110B extends in a direction from a base end portion to a front end portion. The direction from the base end portion to the front end portion is a direction moving away from the antenna ground 6 perpendicular to the lower end portion 6b of the antenna ground 6. The V2X antenna 110B also has a length (element length) that is electrically equal to quarter wavelength. A feeding point 12 that supplies power to the V2X antenna 110B is disposed at the base end portion of the V2X antenna 110B.

The V2X antennas 110A, 110B are displaced from a center portion 6c of the antenna ground 6 in a front-rear direction of the vehicle. A width of the antenna ground 6 in the front-rear direction of the vehicle may be set equal to the length acquired by multiplying quarter wavelength of 5.9 GHz radio wave with the wavelength shortening rate defined by the relative permittivity of material of the substrate 5. A distance between the feeding point 9 and the feeding point 12 may be set equal to a length acquired by multiplying half wavelength of 5.9 GHz radio wave with the wavelength shortening rate defined by the relative permittivity of material of the substrate 5. With this distance between the two feeding points 9, 12, interference between the two antennas 110A, 110B when performing a spatial diversity can be suppressed.

The mobile phone antenna 140 is disposed in the housing 8. Since the operating frequency of the mobile phone communication is lower than the operating frequency of the V2X communication, a length of the mobile phone antenna 140 is set longer than the length of the V2X antenna 110A, 110B. In the present embodiment, an internal space defined by the housing 8 has a longest dimension in an up-down direction of the vehicle. Thus, the mobile phone antenna 140 is disposed in the up-down direction of the vehicle in the housing 8. The mobile phone antenna 140 is also disposed at the closest position in the housing 8 from a rear portion of the vehicle. In the present embodiment, similar to the V2X antennas 110A, 110B, a direction of the mobile phone antenna 140 is in the vertical direction.

The following will describe operations of the ECU 200 and functions performed by the ECU 200.

As shown in FIG. 3, the ECU 200 functions as the interference determination portion 210A and the interference suppression portion 210B. In FIG. 3, the portions 210A and 210B show the functions achieved by the ECU 200, and the arithmetic section 210 shown in FIG. 3 further provides various other functions although not shown in FIG. 3.

The interference determination portion 210A determines whether radio waves received by the V2X communication unit (V2X COMM) 2 is in an interference state, based on a radio wave reception state of the V2X communication unit 2 acquired when a radio wave transmission is being carried out by the mobile phone communication unit (MB COMM) 3. The interference state is a state in which the radio waves transmitted from the mobile phone communication unit 3 interferes with the radio waves being received or to be received by the V2X communication unit 2. Hereinafter, the radio waves being received or to be received by the V2X communication unit 2 is also referred to as radio waves received by the V2X communication.

When the interference determination portion 210A determines that the radio waves received by the V2X communication unit 2 is in the interference state, the interference suppression portion 210B performs an interference suppression process. In the interference suppression process, the interference suppression portion 210E suppresses the radio wave interference between the V2X communication unit 2 and the mobile phone communication unit 3 so that the radio waves received by the V2X communication unit 2 are less adversely affected by the radio waves transmitted from the mobile phone communication unit 3. These functions will be described with reference to the flowchart shown in the drawings.

Figure 4:
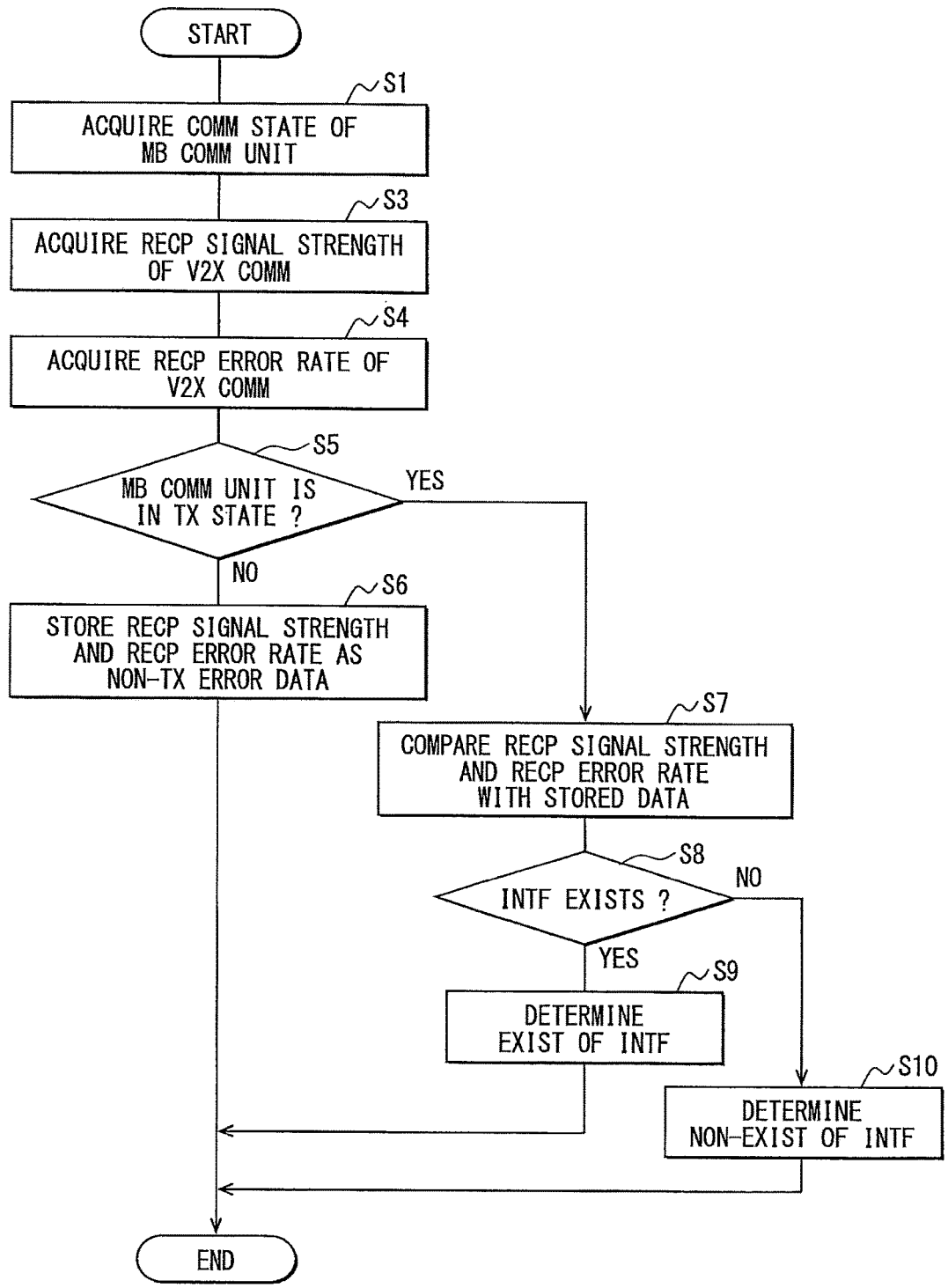
FIG. 4 is a flowchart showing a process executed by an interference determination portion according to the first embodiment.

The following will describe a process executed by the interference determination portion 210A according to the present embodiment with reference to the flowchart shown in FIG. 4. In the present embodiment, the interference determination portion 210A executes the process shown in FIG. 4 at a predetermined time interval.

As shown in FIG. 4, at S1, the interference determination portion 210A acquires a communication state of the mobile phone communication unit 3 from the mobile phone communication chip 270. The communication state acquired at S1 includes information that indicates whether the mobile phone communication unit 3 is in a transmitting state of radio waves.

At S3, the interference determination portion 210A acquires, from the baseband chip 220 of the V2X communication unit 2, signal strength of radio waves received based on the roadside-to-vehicle communication and/or the vehicle-to-vehicle communication. The signal strength of radio waves received based on the roadside-to-vehicle communication may be acquired separately from the signal strength of radio waves received based on the vehicle-to-vehicle communication. Alternatively, the signal strength of radio waves received based both on the roadside-to-vehicle communication and the vehicle-to-vehicle communication may be acquired as one signal strength without distinguishment. Hereinafter, the signal strength of received radio waves is also referred to as reception signal strength.

At S4, the interference determination portion 210A acquires, from the baseband chip 220 of the V2X communication unit 2, a reception error rate of errors occurred in the roadside-to-vehicle communication and the vehicle-to-vehicle communication. The reception error rate of the roadside-to-vehicle communication may be acquired separate from the reception error rate of the vehicle-to-vehicle communication. Alternatively, the reception error rate occurred in both the roadside-to-vehicle communication and the vehicle-to-vehicle communication may be acquired as one reception error rate without distinguishment.

At S5, the interference determination portion 210A determines whether the mobile phone communication unit 3 is in a transmitting state of radio waves based on the communication state acquired at S1. When the mobile phone communication unit 3 is not in the transmitting state (S5: NO), the interference determination portion 210A proceeds to S6. At S6, the interference determination portion 210A stores, in the memory 212, the reception signal strength and the reception error rate as non-transmitting state error data. The non-transmitting state error data is error data acquired while the mobile phone communication unit 3 is in the non-transmitting state.

At S5, when the interference determination portion 210A determines that the mobile phone communication unit 3 is in the transmitting state (S5: YES), the interference determination portion 210A proceeds to S7. At S7, the interference determination portion 210A compares the reception signal strength acquired at S3 and the reception error rate acquired at S4 with the non-transmitting state error data stored in the memory 212. When, with respect to the same reception signal strength, the reception error rate in the transmitting state of the mobile phone communication unit 3 is higher than the reception error rate in the non-transmitting state of the mobile phone communication unit 3, the interference determination portion 210A may determines that the radio waves transmitted from the mobile phone communication unit 3 interferes with the radio waves received by the V2X communication unit 2. For example, the interference determination portion 210A may specify the reception error rate corresponding to the reception signal strength acquired at S3, based on the reception error data which is acquired during the non-transmitting state of the mobile phone communication unit 3 and is stored in the memory 212. Then, the interference determination portion 210A may compare the specified reception signal strength with the reception signal strength acquired at S4. When the reception signal strength acquired at S4 is higher than the specified reception signal strength by a predetermined level, the interference determination portion 210A may determine that the radio waves transmitted from the mobile phone communication unit 3 interferes with the radio waves received by the V2X communication unit 2. The reception error rate and the reception signal strength of the mobile phone communication unit 3 acquired during the non-transmitting state of the mobile phone communication unit 3 is also referred to as a first reception error rate and a first reception signal strength. The reception error rate and the reception signal strength of the mobile phone communication unit 3 acquired during the transmitting state of the mobile phone communication unit 3 is also referred to as a second reception error rate and a second reception signal strength.

At S8, the interference determination portion 210A determines whether the V2X communication unit 2 is in the interference state. When the interference determination portion 210A determines that the V2X communication unit 2 is in the interference state (S8: YES), the interference determination portion 210A proceeds to S9 and outputs an interference determination result that indicating an existence of the interference. When the interference determination portion 210A determines that the V2X communication unit 2 is not in the interference state (S8: NO), the interference determination portion 210A proceeds to S10 and outputs an interference determination result that indicating non-existence of the interference.

Figure 5:
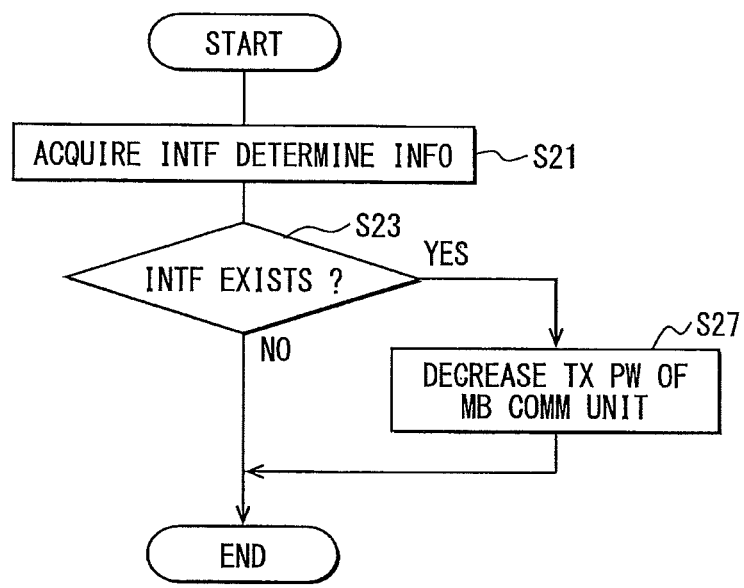
FIG. 5 is a flowchart showing a process executed by an interference suppression portion according to the first embodiment.

The following will describe a process executed by the interference suppression portion 210B according to the present embodiment with reference to the flowchart shown in FIG. 5. In the present embodiment, the interference suppression portion 210B executes the process shown in FIG. 5 at a predetermined time interval. As shown in FIG. 5, at S21, the interference suppression portion 210B acquires interference determination information indicating a determination result of interference existence. In the present embodiment, the interference determination information is the interference determination result acquired at S9 or S10 in FIG. 4.

At S23, the interference suppression portion 210B determines whether the interference exists based on the interference determination information acquired at S21. When no interference exists (S23: NO), the interference suppression portion 210B ends the process.

When interference exists (S23: YES), the interference suppression portion 210B proceeds to S27.

At S27, the interference suppression portion 210B controls the mobile phone communication unit 3 to decrease a transmission power. Specifically, the interference suppression portion 210B outputs, to the mobile phone communication chip 270, an instruction for controlling the mobile phone communication unit 3 to decrease the transmission power. When the CPU 272 of the mobile phone communication chip 270 receives the instruction, the CPU 272 decreases an amplification gain of the transmitting circuit 276 to decrease the transmission power of the mobile phone communication unit 3.

The transmission power of the mobile phone communication unit 3 may be decreased by a predetermined value or may be decreased by a predetermined ratio. The predetermined value or the predetermined ratio by which the transmission power is decreased may be set corresponding to a difference between the reception error rate acquired in the non-transmitting state of the mobile phone communication unit 3 and the reception error rate acquired in the transmitting state of the mobile phone communication, which two are compared with each other at S7.

The following will describe advantages provided by the first embodiment.

As described above, in the first embodiment, as shown in FIG. 3 and FIG. 4, the interference determination portion 210A determines whether the radio waves received by the V2X communication unit 2 is in the interference state. That is, the interference determination portion 210A determines whether the radio waves transmitted from the mobile phone communication unit 3 interferes with the radio waves being received or to be received by the V2X communication unit 2. When the interference determination portion 210A determines that the radio waves received by the V2X communication unit 2 is in the interference state, the interference suppression portion 210B decreases the transmission power of the mobile phone communication unit 3 as the interference suppression process as shown in FIG. 3 and FIG. 5. When the transmission power of the mobile phone communication unit 3 is decreased, the radio waves transmitted from the mobile phone communication unit 3 less interferes with the radio waves received by the V2X communication unit 2. That is, the interference caused by the mobile phone communication unit 3 to the V2X communication unit 2 is suppressed.

Under only a condition that the mobile phone communication unit 3 is in the transmitting state, the interference suppression portion 210B does not execute the interference suppression process. That is, when the interference determination portion 210A determines that the radio waves received by the V2X communication unit 2 is not in the interference state during the transmitting state of the mobile phone communication unit 3, the interference suppression portion 210B does not decrease the transmission power of the mobile phone communication unit 3. With this configuration, a communication suppression made to the mobile phone communication unit 3 is reduced.

Second Embodiment

The following will describe a second embodiment of the present disclosure. In addition, in the description of the following embodiments, the same reference symbol is used for the same or equivalent part of the first embodiment except for a case where a particular description needs to be made. In the following embodiments, when only a part of a configuration, instead of the entire configuration, is described, the other part of the configuration may have a similar or the equivalent configuration with which is previously described in the foregoing embodiments.

Figure 6:
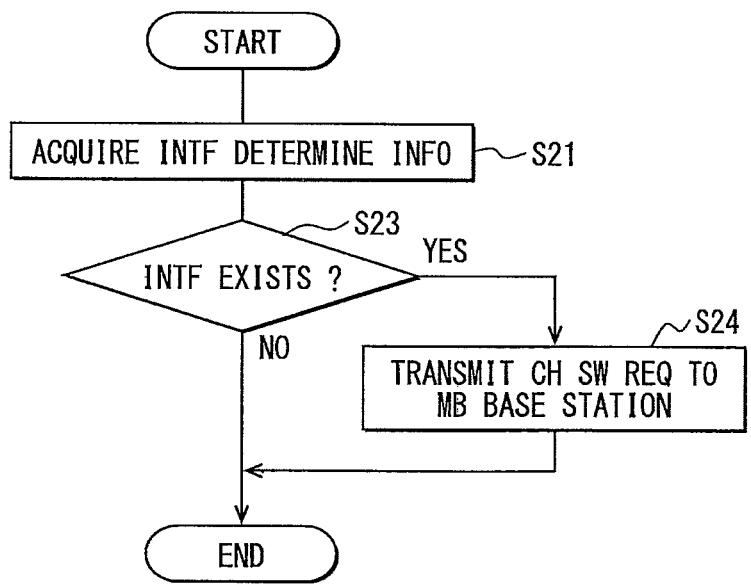
FIG. 6 is a flowchart showing a process executed by an interference suppression portion according to a second embodiment.

In the present embodiment, the interference suppression portion 210B executes a process shown in FIG. 6, instead of the process shown in FIG. 5. Other configurations and operations are similar to the first embodiment.

In the process shown in FIG. 6, processes executed at S21 and S23 are similar to the process shown in FIG. 5. At S23, when the interference suppression portion 210B determines that an interference exists (S23: NO), the interference suppression portion 210B proceeds to S24. At S24, the interference suppression portion 210B instructs the mobile phone communication chip 270 to transmit a communication channel switch request to a base station of the mobile communication in order to switch an operating communication channel of the mobile phone communication unit 3.

The following will describe advantages provided by the first embodiment.

As described above, in the second embodiment, when the interference determination portion 210A determines that the radio waves received by the V2X communication unit 2 is in the interference state, the interference suppression portion 210B switches the operating communication channel of the mobile phone communication unit 3 to another channel as the interference suppression process.

Interference may be generated under a specific frequency relation, such as harmonic. Thus, when the interference occurs, the interference can be avoided by changing the communication channel of the mobile phone communication unit 3 as described in the present embodiment. Since the communication channel of the mobile phone communication unit 3 is switched to another channel, the communication provided by the mobile phone communication unit 3 can be continued without being interrupted. Thus, a communication suppression made to the mobile phone communication unit 3 is reduced.

Third Embodiment

Figure 7:
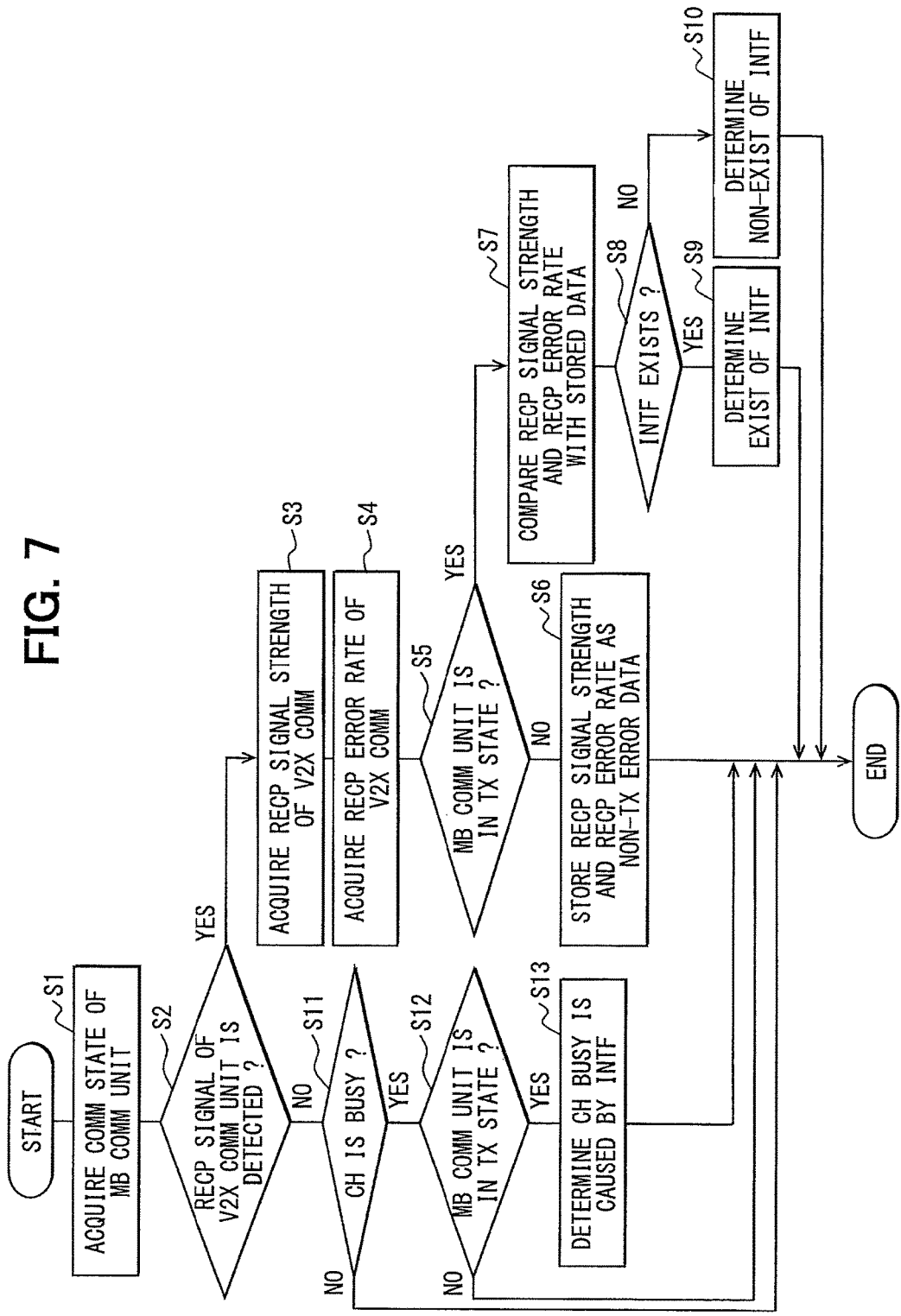
FIG. 7 is a flowchart showing a process executed by an interference determination portion according to a third embodiment.

In the present embodiment, the interference determination portion 210A executes a process shown in FIG. 7, instead of the process shown in FIG. 4. Other configurations and operations are similar to the first embodiment and the second embodiment.

As shown in FIG. 7, at S1, the interference determination portion 210A acquires the communication state of the mobile phone communication unit 3. At S2, the interference determination portion 210A determines whether a reception signal of the roadside-to-vehicle communication or the vehicle-to-vehicle communication is detected. The reception signal of the roadside-to-vehicle communication or the vehicle-to-vehicle communication may be one of a signal received by the roadside-to-vehicle communication and a signal received by the vehicle-to-vehicle communication.

When the interference determination portion 210A determines that the reception signal is detected (S2: YES), the interference determination portion 210A executes S3 to S10. Processes executed at S3 to S10 are similar to the first embodiment.

When the interference determination portion 210A determines that the reception signal is not detected (S2: NO), the interference determination portion 210A cannot execute S3 to S10 since the processes of S3 to S10 are executed based on the reception error rate of the reception signal. Thus, the interference determination portion 210A proceeds to S11 in order to determine whether a detection failure of the reception signal is caused by a high-level interference generated by the mobile phone communication unit 3. Herein, high-level interference has an interference degree higher than a predetermined level.

At S11, the interference determination portion 210A determines whether an operating communication channel of the V2X communication unit 2 is in a busy state. Specifically, the interference determination portion 210A determines whether the operating communication channel is in the busy state by determining whether a reception power of the V2X communication unit 2 is equal to or higher than a threshold value. When the interference determination portion 210A determines that the operating communication channel of the V2X communication unit 2 is not in the busy state (S11: NO), the interference determination portion 210A ends the process shown in FIG. 7. When the interference determination portion 210A determines that the operating communication channel of the V2X communication unit 2 is in the busy state (S11: YES), the interference determination portion 210A proceeds to S12.

At S12, the interference determination portion 210A determines whether the mobile phone communication unit 3 is in the transmitting state based on the communication state acquired at S1. When the interference determination portion 210A determines that the mobile phone communication unit 3 is not in the transmitting state (S12: NO), the interference determination portion 210A determines that the busy state of the communication channel of the V2X communication is not caused by the interference generated by the transmission radio waves of the mobile phone communication unit 3, and ends the process shown in FIG. 7. When the interference determination portion 210A determines that the mobile phone communication unit 3 is in the transmitting state (S12: YES), the interference determination portion 210A proceeds to S13. At S13, the interference determination portion 210A determines that the busy state of the communication channel of the V2X communication is caused by the interference generated by the transmission radio waves of the mobile phone communication unit 3.

Figure 8:
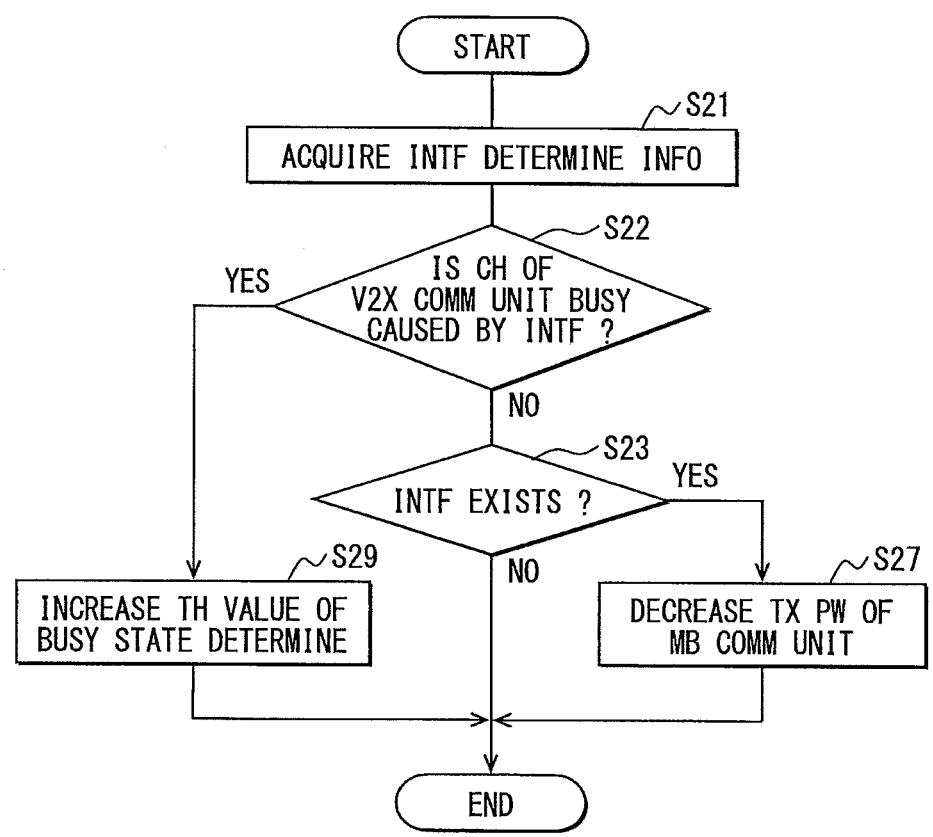
FIG. 8 is a flowchart showing a process executed by an interference suppression portion according to the third embodiment.

The interference suppression portion 210B according to the present embodiment executes a process shown in FIG. 8. As shown in FIG. 8, after the interference suppression portion 210B acquires the interference determination information at S21, the interference suppression portion 210B determines whether the operating communication channel of the V2X communication is in the busy state at S22. Specifically, at S22, the interference suppression portion 210B determines whether the busy state of the operating communication channel of the V2X communication is caused by the interference.

When the interference suppression portion 210B determines that the operating communication channel is not in the busy state (S22: NO), the interference suppression portion 210B proceeds to S23. The processes executed at S23 and S27 are similar to the processes of S23 and S27 shown in FIG. 5. When the interference suppression portion 210B determines that the operating communication channel is in the busy state (S22: YES), the interference suppression portion 210B proceeds to S29.

At S29, the interference suppression portion 210B increases the threshold value used to determine whether the communication channel of the roadside-to-vehicle communication or the vehicle-to-vehicle communication is in the busy state. That is, the interference suppression portion 210B increases the threshold value used to determine whether the communication channel of the V2X communication is in the busy state. In the determination of the busy state, when the reception power is equal to or higher than the threshold value, the communication channel is determined to be in the busy state. Thus, the busy state of the communication channel is less likely to be determined by increasing the threshold value of the reception power. For example, the threshold value may be increased by an amount to a lower limit reference value at which the communication channel is not determined to be in the busy state. Further, the threshold value may be increased to a value that is acquired by adding a margin to the lower limit reference value. Further, the threshold value may be increased to a predetermined value.

The following will describe advantages provided by the third embodiment.

In the third embodiment, the interference determination portion 210A determines whether the busy state of the communication channel of the V2X communication is caused by the interference generated by the transmission radio waves of the mobile phone communication unit 3 (S2, S11~S13). When the interference determination portion 210A determines that the busy state of the communication channel of the V2X communication unit 2 is caused by the interference generated by the transmission radio waves of the mobile phone communication unit 3, the interference suppression portion 210B increases the threshold value used to determine the busy state of the communication channel of the V2X communication. With this configuration, the communication channel of the V2X communication is less likely to be determined in the busy state.

Under a case where the busy state of the communication channel of the V2X communication is determined to be caused by the interference, the reception power of the V2X communication is higher than the threshold value even when the packet signal that is required to be received has not been received by the V2X communication unit 2. In a case where the packet signal that is required to be received is received by the V2X communication unit 2, the communication channel of the V2X communication is still determined to be in the busy state. Thus, a reception timing of the packet signal cannot be specified when the threshold value for determining the busy state has a relatively low value.

In the present embodiment, the threshold value for determining the busy state of the communication channel of the V2X communication is increased. Thus, during the reception period of the packet signals required to be received, the reception power becomes higher than the threshold value. With this configuration, the reception timing of the packet signal can be detected and the received signal can be detected with a high accuracy.

Fourth Embodiment

Figure 9:
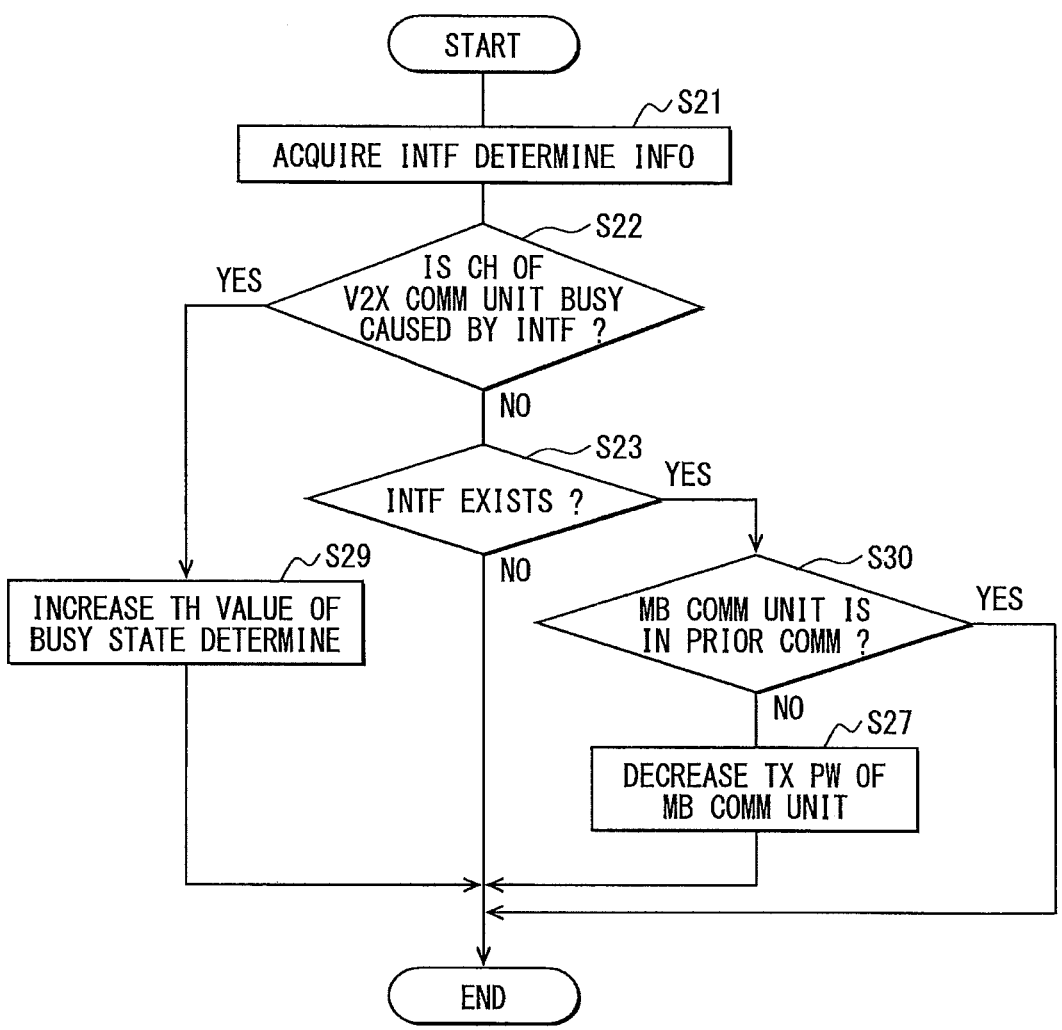
FIG. 9 is a flowchart showing a process executed by an interference suppression portion according to a fourth embodiment.

In the present embodiment, the interference suppression portion 210B executes a process shown in FIG. 9. Other configuration and operations are similar to the third embodiment. In FIG. 9, S30 is added to the process compared with the process shown in FIG. 8.

As shown in FIG. 9, when the interference exists (S23: YES), the interference suppression portion 210B proceeds to S30. At S30, the interference suppression portion 210B determines whether the mobile phone communication unit 3 is performing a priority communication. Herein, priority communication is a communication having a priority higher than a predetermined level, and includes an emergency report made to a police agency or a fire station, an emergency report automatically made for notifying an accident or the like. The interference suppression portion 210B may determine whether the mobile phone communication unit 3 is performing the priority communication by determining whether the mobile phone communication unit 3 is performing a communication with a partner having a telephone number that is preliminarily registered as priority communication numbers.

When the interference suppression portion 210B determines that the mobile phone communication unit 3 is not performing the priority communication (S30: NO), the interference suppression portion 210B decreases the transmission power of the mobile phone communication unit 3 at S27. When the interference suppression portion 210B determines that the mobile phone communication unit 3 is performing the priority communication (S30: YES), the interference suppression portion 210B does not execute S27 in order to give priority to the priority communication.

The following will describe advantages provided by the fourth embodiment.

In the fourth embodiment, when the interference exists (S23: YES) and the mobile phone communication unit 3 is not performing the priority communication (S30: NO), the interference suppression portion 210B decreases the transmission power of the mobile phone communication unit 3. With this configuration, an interference caused by the radio waves transmitted from the mobile phone communication unit 3 to the radio waves received by the V2X communication unit 2 is suppressed.

When the interference exists (S23: YES) and the mobile phone communication unit 3 is performing the priority communication (S30: YES), interference suppression portion 210B does not decrease the transmission power of the mobile phone communication unit 3. Thus, the priority communication of the mobile phone communication unit 3, which has a higher priority than the vehicle-to-vehicle communication and the roadside-to-vehicle communication, can be continued without interrupt.

Fifth Embodiment

Figure 10:
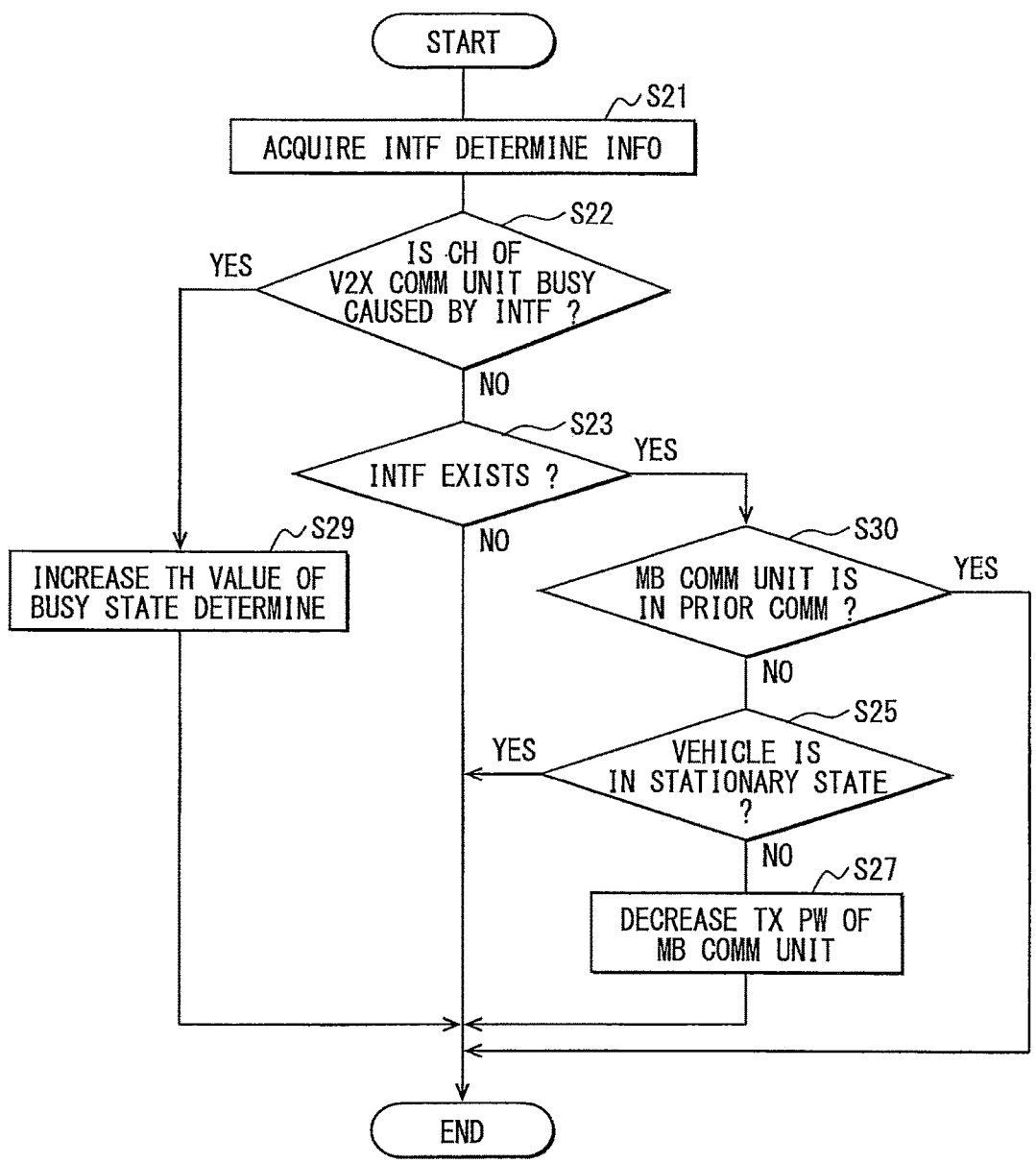
FIG. 10 is a flowchart showing a process executed by an interference suppression portion according to a fifth embodiment.

In the present embodiment, the interference suppression portion 210B executes a process shown in FIG. 10. Other configuration and operations are similar to the third embodiment and the fourth embodiment. In FIG. 10, S25 is added to the process compared with the process shown in FIG. 9.

As shown in Hg. 10, when the interference suppression portion 210B determines that the mobile phone communication unit 3 is not performing the priority communication (S30: NO), the interference suppression portion 210B proceeds to S25. At S25, the interference suppression portion 210B determines whether the vehicle equipped with the wireless communication apparatus 1 is in a stationary state. The interference suppression portion 210B may determine whether the vehicle is in the stationary state based on a vehicle speed or a shift position acquired via the vehicle LAN 300.

When the interference suppression portion 210B determines that the vehicle is not in the stationary state (S25: NO), the interference suppression portion 210B decreases the transmission power of the mobile phone communication unit 3 at S27. When the interference suppression portion 210B determines that the vehicle is in the stationary state (S25: NO), the interference suppression portion 210B determines that giving priority to the V2X communication is not highly needed and does not execute S27.

The following will describe advantages provided by the fifth embodiment.

In the fifth embodiment, when the interference exists (S23: YES) and the mobile phone communication unit 3 is not performing the priority communication (S30: NO) and the vehicle is not in the stationary state (S25: NO), the interference suppression portion 210B decreases the transmission power of the mobile phone communication unit 3. With this configuration, an interference caused by the radio waves transmitted from the mobile phone communication unit 3 to the radio waves received by the V2X communication unit 2 is suppressed.

When the vehicle is in the stationary state (S25: YES) even though the interference exists (S23: YES), the interference suppression portion 210B does not decrease the transmission power of the mobile phone communication unit 3. Thus, when the vehicle is in the stationary state, that is, when giving priority to the V2X communication is not highly needed, a decrease of the transmission power of the mobile phone communication unit 3 is not carried out.

Sixth Embodiment

Figure 11:
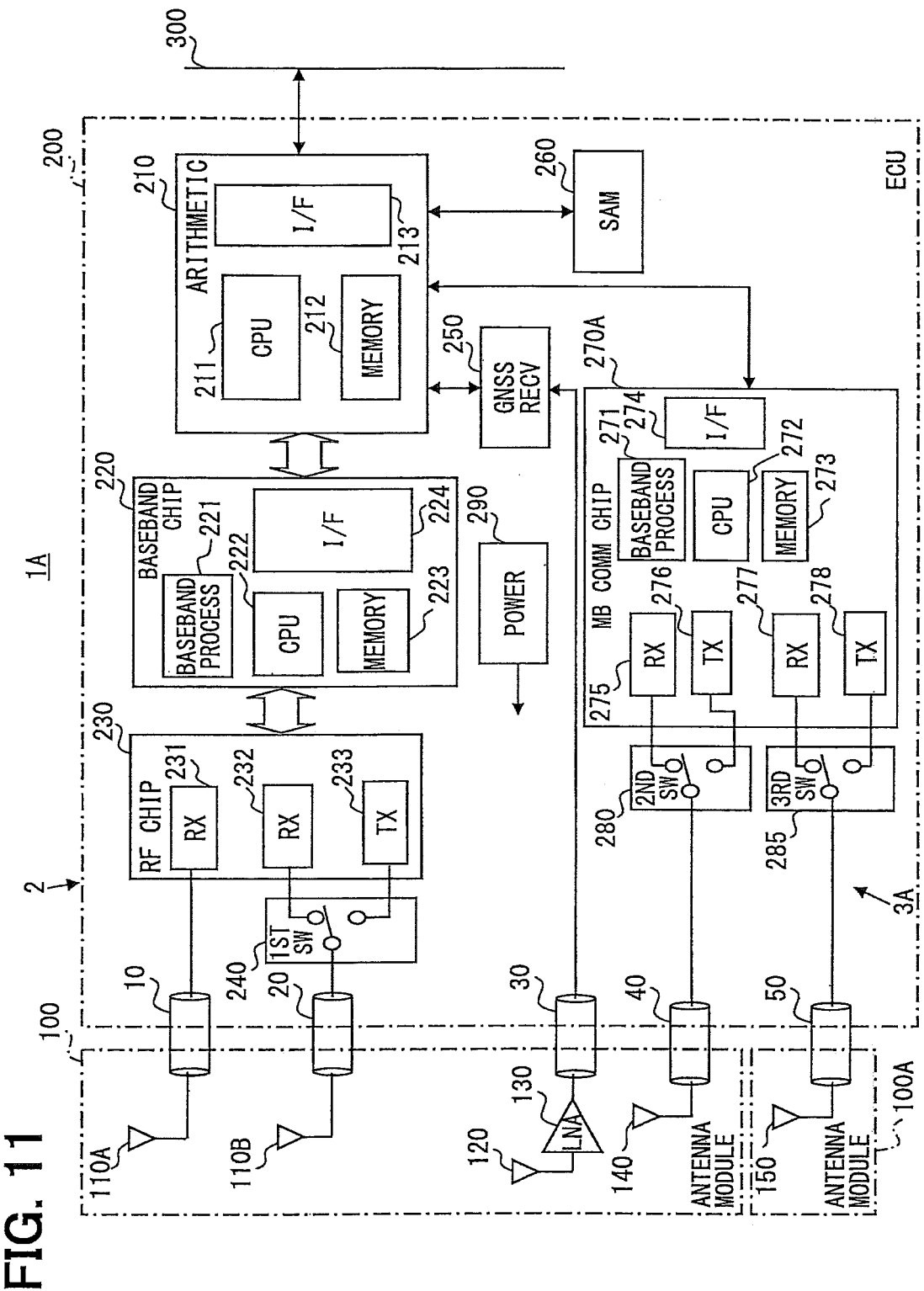
FIG. 11 is a diagram showing a configuration of a vehicular wireless communication apparatus according to a sixth embodiment of the present disclosure.

FIG. 11 shows a configuration of a vehicular wireless communication apparatus 1A according to a sixth embodiment of the present disclosure. The vehicular wireless communication apparatus 1A according to the present embodiment has a mobile phone communication unit (MB COMM) 3A that is different from the mobile phone communication unit 3 shown in FIG. 1.

More specifically, the mobile phone communication unit 3A has one more mobile phone antenna 150 in addition to the mobile phone antenna 140 included in the wireless communication apparatus 1 shown in FIG. 1.

The mobile phone communication unit 3A further includes a coaxial cable 50 and a third switch circuit 285, both of which correspond to the mobile phone antenna 150.

The mobile phone communication chip 270A further includes a receiving circuit (RX) 277 and a transmitting circuit (TX) 278 that are paired with each other, in addition to the receiving circuit 275 and the transmitting circuit 276 that are paired with each other. The mobile phone communication unit 3A according to the sixth embodiment performs a multiple input multiple output (MIMO) communication using the two mobile phone antennas 140, 150, the two receiving circuits 275, and the two transmitting circuits 276, 278. The receiving circuit 275 and the transmitting circuit 276 correspond to the mobile phone antenna 140, and the receiving circuit 277 and the transmitting circuit 278 correspond to the mobile phone antenna 150.

Figure 12:
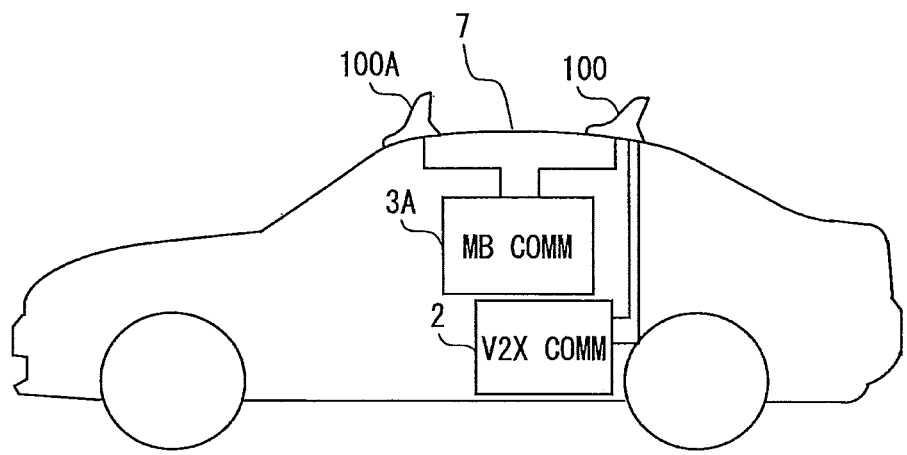
FIG. 12 is a diagram showing an equipment position of an antenna module to a vehicle according to the sixth embodiment.

The mobile phone antenna 150 is disposed in an antenna module 100A shown in FIG. 12. The antenna module 100A is disposed at a front portion of the vehicle roof 7. The two V2X antennas 110A, 110B and the other mobile phone antenna 140 are disposed in the antenna module 100, and the antenna module 100 is disposed at the rear portion of the vehicle roof 7. Thus, a distance between the mobile phone antenna 140 and the V2X antenna 110 is different from a distance between the mobile phone antenna 150 and the V2X antenna 110. The mobile phone antenna 150 disposed in the antenna module 100A is farther from the V2X antenna 110 compared with the other mobile phone antenna 140.

In the sixth embodiment, the interference determination portion 210A performs the process shown in FIG. 4 or in FIG. 7, similar to the foregoing embodiments. The interference suppression portion 210B performs a process shown in FIG. 13.

Figure 13:
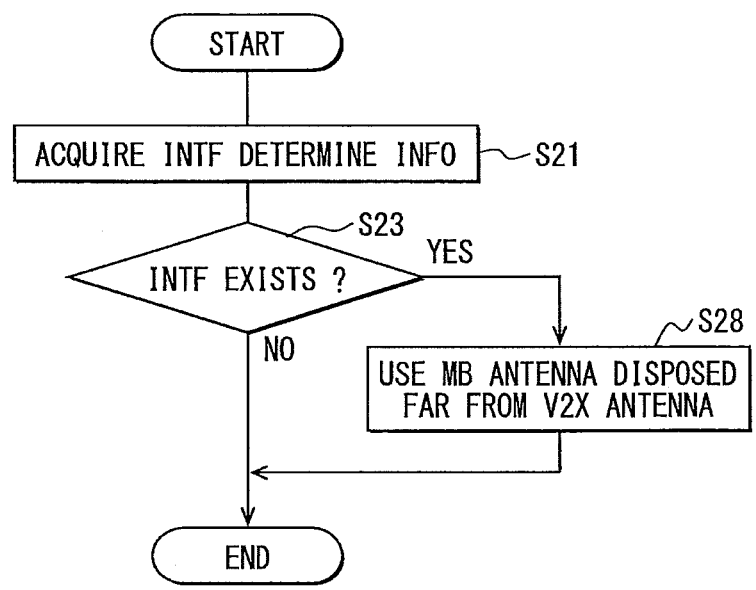
FIG. 13 is a flowchart showing a process executed by an interference suppression portion according to the sixth embodiment.

As shown in FIG. 13, the interference suppression portion 210B executes S21 and S23 similar to the process shown in FIG. 5. At S23, when the interference suppression portion 210E determines that the interference exists, the interference suppression portion 210B proceeds to S28. At S28, among the two mobile phone antennas 140, 150, the interference suppression portion 210B determines to use only the mobile phone antenna 150 that is disposed farther from the V2X antenna 110, compared with the other mobile phone antenna 140.

The following will describe advantages provided by the sixth embodiment.

In the sixth embodiment, as the interference suppression process, the interference suppression portion 210B determines to use only the mobile phone antenna 150 that is disposed farther from the V2X antenna 110, compared with the other mobile phone antenna 140. The interference is more likely to be occurred when a distance between the two antennas is short. Thus, as described in the sixth embodiment, the interference can be suppressed or reduced by using the mobile phone antenna 150 that is disposed farther from the V2X antenna 110 from the mobile phone antennas 140, 150.

Seventh Embodiment

Figure 14:
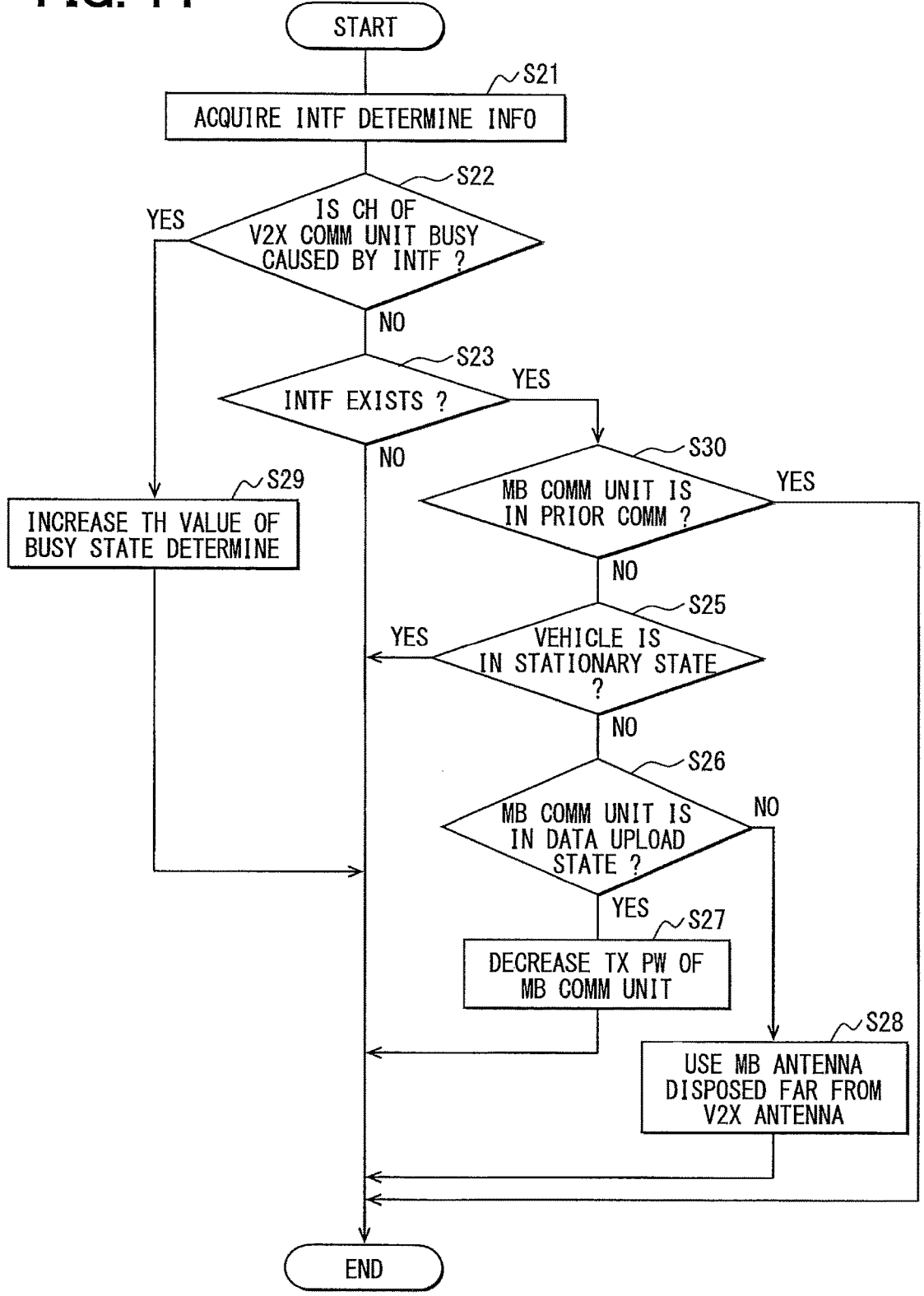
FIG. 14 is a flowchart showing a process executed by an interference suppression portion according to a seventh embodiment.

In the present embodiment, the interference suppression portion 210B executes a process shown in FIG. 14. Other configuration and operations are similar to the sixth embodiment. In FIGS. 14, S26 and S28 are added to the process compared with the process shown in FIG. 10.

As shown in FIG. 14, when the interference suppression portion 210B determines that the vehicle is not in the stationary state (S25: NO), the interference suppression portion 210B proceeds to S26. At S26, the interference suppression portion 210B determines whether the mobile phone communication unit 3 is performing an uploading operation for uploading large amount of data. The interference suppression portion 210B may determine whether the mobile phone communication unit 3 is performing the uploading operation of the large amount of data by acquiring, from the mobile phone communication chip 270A, total data amount of the uploading operation and determining whether the total data amount is equal to or greater than a predetermined threshold amount.

When the interference suppression portion 210B determines that the mobile phone communication unit 3 is not performing the uploading operation for uploading large amount of data (S26: NO), the interference suppression portion 210B determines to use the mobile phone antenna 150 that is disposed farther from the V2X antenna 110 compared with the other mobile phone antenna 140 at S28. When the interference suppression portion 210B determines that the mobile phone communication unit 3 is performing the uploading operation for uploading large amount of data (S26: YES), the interference suppression portion 210B decreases the transmission power of the mobile phone communication unit 3 at S27 without selecting the antenna to be used. That is, the interference suppression portion 210B continues to use the two mobile phone antennas 140, 150, and decreases the transmission powers of the two mobile phone antennas 140, 150.

The following will describe advantages provided by the seventh embodiment.

In the seventh embodiment, when the interference exists (S23: YES) and the vehicle is not in the stationary state (S25: NO) and the mobile phone communication unit 3 is not performing the uploading operation of great amount of data (S26: NO), only the mobile phone antenna 150 that is disposed farther from the V2X antenna 110 compared with the other mobile phone antenna 140 is used for the mobile phone communication. Herein, the great amount of data may be data set, data group or data array that has a data size greater than a predetermined threshold size. With this configuration, interference caused by the mobile phone communication 3 can be suppressed or reduced.

When the mobile phone communication unit 3 is performing the uploading operation of great amount of data (S26: YES), the transmission power of the mobile phone communication unit 3 is decreased for suppressing the interference.

With this configuration, a decrease of throughput is suppressed during an uploading of the great amount of data. Further, even during the uploading of the great amount of data, the interference can be suppressed by decreasing the transmission power.

First Modification

For example, in the second embodiment, the communication channel of the mobile phone communication unit 3 is changed. As another example, instead of changing the communication channel of the mobile phone communication unit 3, a communication channel of the V2X communication unit 2 may be changed. As another example, both the communication channel of the mobile phone communication unit 3 and the communication channel of the V2X communication unit 2 may be changed.

Second Modification

In FIG. 10 and FIG. 14, S30 may be not executed. That is, when determination at S23 is YES, S25 may be directly executed.

Third Modification

In FIGS. 14, S30 and S25 may be not executed. That is, when determination at S23 is YES, S26 may be directly executed.

Fourth Modification

In the foregoing embodiments, the first wireless communication unit is provided by the V2X communication unit 2, and the second wireless communication unit is provided by the mobile phone communication unit 3. However, the first wireless communication unit is not limited to the V2X communication unit 2. Similarly, the second wireless communication unit is not limited to the mobile phone communication unit 3. The first wireless communication unit and the second wireless communication unit may be provided by wireless communication units that provide wireless communications different from one another. Thus, the wireless communication apparatus is not limited to vehicle use. That is, the wireless communication apparatus may be a portable communication apparatus.

Fifth Modification

In the foregoing embodiments, the V2X communication unit 2 performs both the vehicle-to-vehicle communication and the roadside-to-vehicle communication. Alternatively, the V2X communication unit 2 may perform at least one of the vehicle-to-vehicle communication or the roadside-to-vehicle communication.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A wireless communication apparatus comprising:
    a first wireless communication unit performing a first type wireless communication;
    a second wireless communication unit performing a second type wireless communication different from the first type wireless communication;
    an interference determination portion acquiring a radio wave reception state of the first wireless communication unit when the second wireless communication unit transmits radio waves, and determining whether the first wireless communication unit is in an interference state based on the radio wave reception state of the first wireless communication unit, the interference state being a state in which radio waves received by the first wireless communication unit are interfered by the radio waves transmitted from the second wireless communication unit; and
    an interference suppression portion executing an interference suppression process in response to a determination of the interference state by the interference determination portion, the interference suppression process suppressing the radio waves transmitted from the second wireless communication from interfering with the radio waves received by the first wireless communication unit,
    wherein the interference determination portion acquires a first reception error rate and a first reception signal strength of the first wireless communication unit when the second wireless communication unit is in a non-transmitting state of the radio waves,
    wherein the interference determination portion acquires a second reception error rate and a second reception signal strength of the first wireless communication unit when the second wireless communication unit is in a transmitting state of the radio waves, and
    wherein the interference determination portion determines whether the first wireless communication unit is in the interference state by comparing the first reception error rate with the second reception error rate or by comparing the first reception signal strength with the second reception signal strength.

\* \* \* \* \*